United States Patent
Momose

(10) Patent No.: US 10,425,004 B2
(45) Date of Patent: Sep. 24, 2019

(54) POWER CONVERTER AND CONTROL METHOD OF POWER CONVERTER

(71) Applicant: TOYOTA JIDOSHA KABUSHIKI KAISHA, Toyota-shi (JP)

(72) Inventor: Masafumi Momose, Anjo (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/267,440

(22) Filed: Feb. 5, 2019

(65) Prior Publication Data

US 2019/0245428 A1 Aug. 8, 2019

(30) Foreign Application Priority Data

Feb. 7, 2018 (JP) .................. 2018-020302

(51) Int. Cl.
| | |
|---|---|
| H02M 1/00 | (2006.01) |
| H02M 1/10 | (2006.01) |
| H02M 3/335 | (2006.01) |
| B60W 20/13 | (2016.01) |
| B60L 50/51 | (2019.01) |
| H02M 7/72 | (2006.01) |

(52) U.S. Cl.
CPC .............. H02M 1/10 (2013.01); B60L 50/51 (2019.02); B60W 20/13 (2016.01); H02M 3/33507 (2013.01); H02M 7/72 (2013.01)

(58) Field of Classification Search
CPC ...... H02M 1/10; H02M 7/72; H02M 3/33507; B60L 50/51; B60W 20/13
See application file for complete search history.

(56) References Cited

U.S. PATENT DOCUMENTS

| | | | |
|---|---|---|---|
| 2009/0066277 A1 | 3/2009 | Ang et al. | |
| 2016/0162014 A1* | 6/2016 | Jeon | .......................... G06F 1/26 713/323 |
| 2016/0332529 A1 | 11/2016 | Kumazawa et al. | |

FOREIGN PATENT DOCUMENTS

| | | |
|---|---|---|
| JP | 2008-5625 | 1/2008 |
| JP | 2015-139282 | 7/2015 |

* cited by examiner

*Primary Examiner* — Adolf D Berhane
*Assistant Examiner* — Afework S Demisse
(74) *Attorney, Agent, or Firm* — Oblon, McClelland, Maier & Neustadt, L.L.P.

(57) ABSTRACT

A power converter includes: a power conversion circuit; and an electronic control unit configured to output plural control commands for a first switching element and a second switching element to the power conversion circuit. The electronic control unit is configured to output a first drive command, a second drive command, a first drive stop command, and a second drive stop command. The first drive command is a command to turn on the first switching element. The second drive command is a command to turn on the second switching element. The first drive stop command is a command to turn off the first switching element regardless of presence or absence of the first drive command. The second drive stop command is a command to turn off the second switching element regardless of presence or absence of the second drive command.

9 Claims, 14 Drawing Sheets

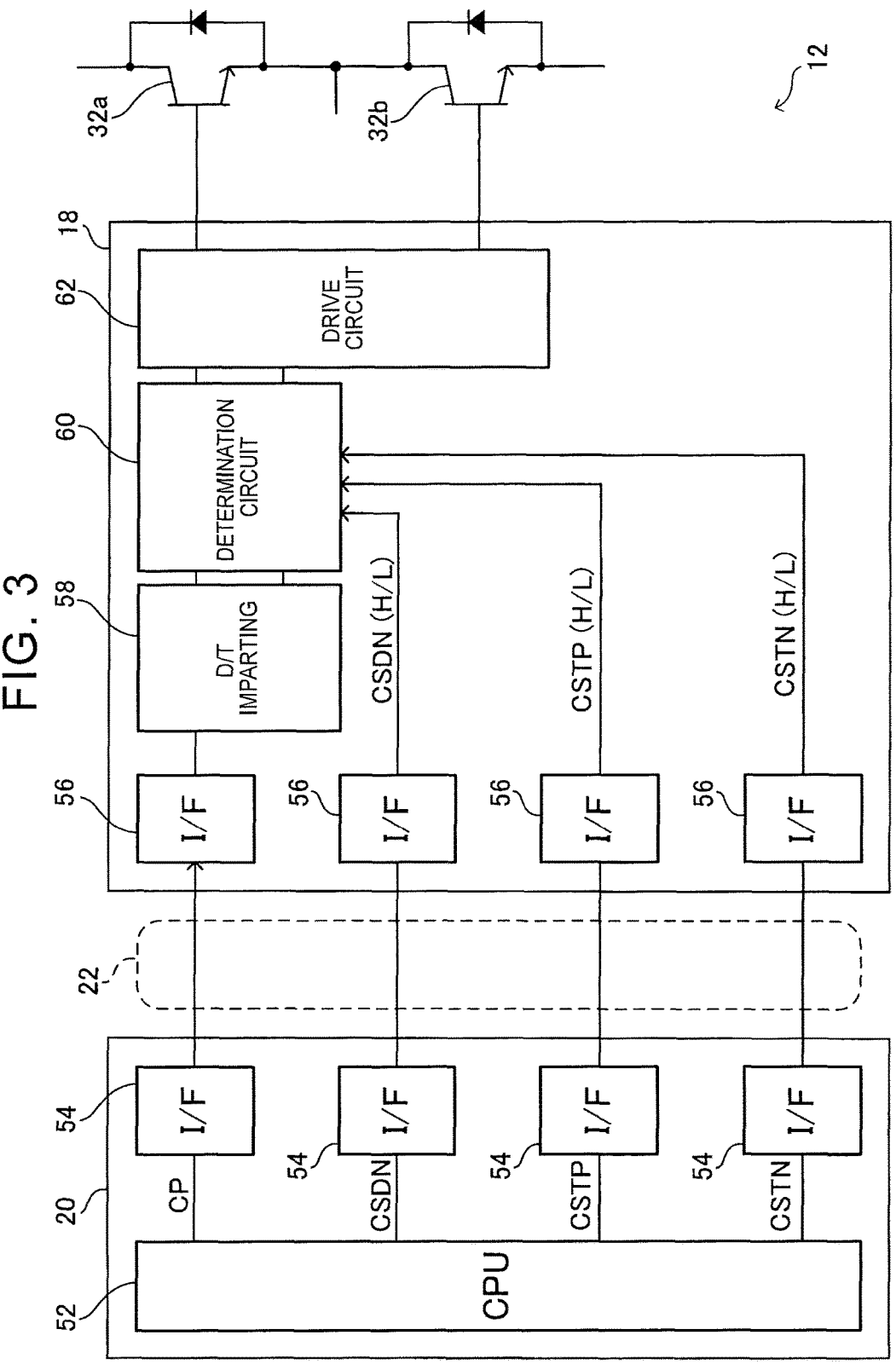

FIG. 4

| CONTROL SIGNAL | SIGNAL VALUE | COMMAND CONTENTS |
|---|---|---|
| DRIVE SIGNAL CP | HIGH LEVEL H | SECOND DRIVE COMMAND (DRIVE SECOND SW ELEMENT) |
|  | LOW LEVEL L | FIRST DRIVE COMMAND (DRIVE FIRST SW ELEMENT) |
| DRIVE PROHIBITION SIGNAL CSDN | HIGH LEVEL H | DRIVE PERMISSION COMMAND (PERMIT DRIVING OF BOTH SW ELEMENTS) |
|  | LOW LEVEL L | DRIVE PROHIBITION COMMAND (PROHIBIT DRIVING OF BOTH SW ELEMENTS) |
| FIRST DRIVE STOP SIGNAL CSTP | HIGH LEVEL H | FIRST DRIVE STOP COMMAND (STOP DRIVING OF FIRST SW ELEMENT) |
|  | LOW LEVEL L | FIRST DRIVE PERMISSION COMMAND (PERMIT DRIVING OF FIRST SW ELEMENT) |
| SECOND DRIVE STOP SIGNAL CSTN | HIGH LEVEL H | SECOND DRIVE STOP COMMAND (STOP DRIVING OF SECOND SW ELEMENT) |
|  | LOW LEVEL L | SECOND DRIVE PERMISSION COMMAND (PERMIT DRIVING OF SECOND SW ELEMENT) |

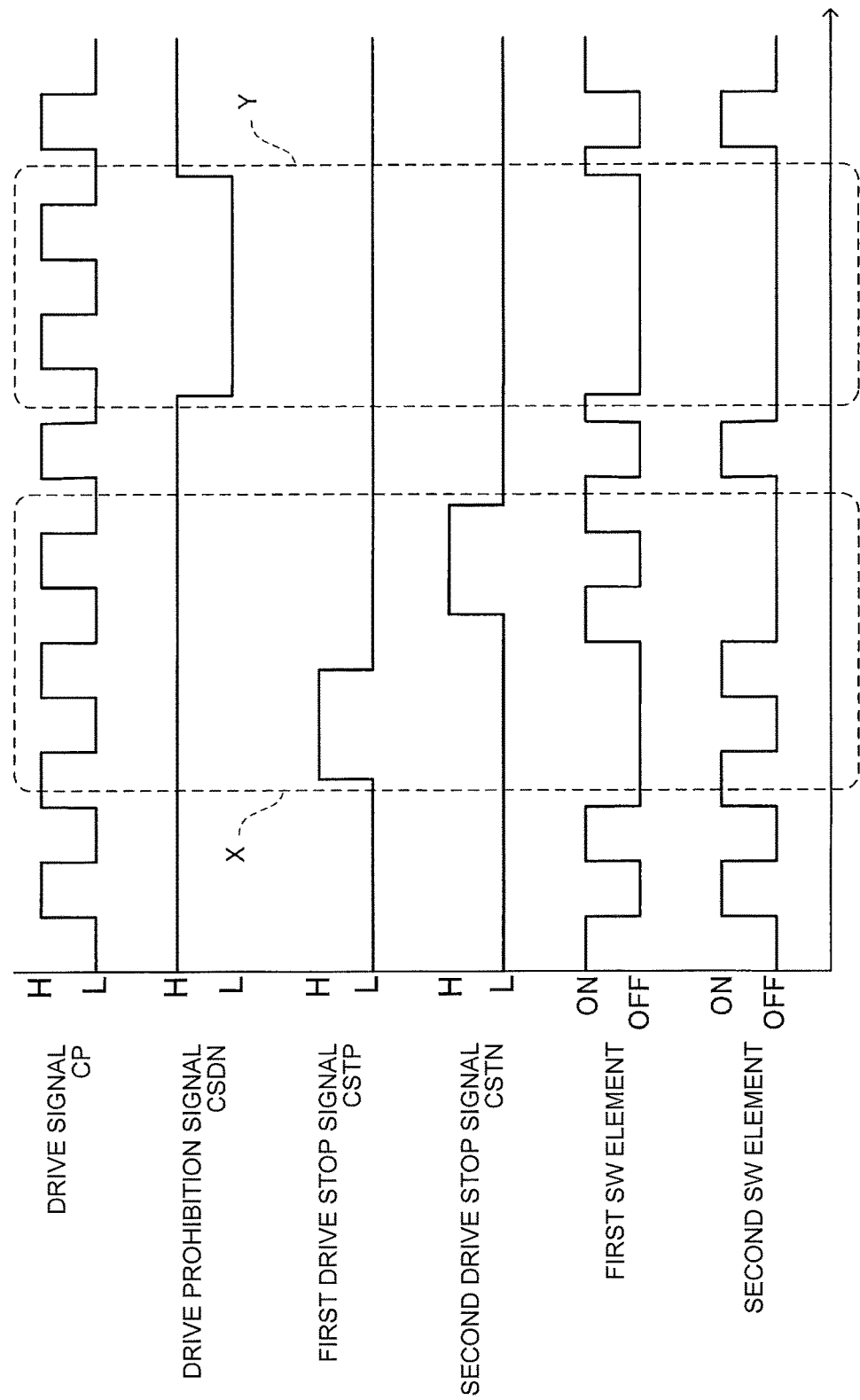

FIG. 8

| CONTROL SIGNAL | | SIGNAL VALUE | COMMAND CONTENTS |
|---|---|---|---|
| DRIVE SIGNAL CP | | HIGH LEVEL H | SECOND DRIVE COMMAND (DRIVE SECOND SW ELEMENT) |
| | | LOW LEVEL L | FIRST DRIVE COMMAND (DRIVE FIRST SW ELEMENT) |
| DRIVE PROHIBITION SIGNAL CSDN | | HIGH LEVEL H | DRIVE PERMISSION COMMAND (PERMIT DRIVING OF BOTH SW ELEMENTS) |
| | | LOW LEVEL L | DRIVE PROHIBITION COMMAND (PROHIBIT DRIVING OF BOTH SW ELEMENTS) |
| DRIVE STOP SIGNAL CST | | HIGH LEVEL H | FIRST DRIVE STOP COMMAND (STOP DRIVING OF FIRST SW ELEMENT) |
| | | MIDDLE LEVEL M | DRIVE PERMISSION COMMAND (PERMIT DRIVING OF BOTH SW ELEMENTS) |
| | | LOW LEVEL L | SECOND DRIVE STOP COMMAND (STOP DRIVING OF SECOND SW ELEMENT) |

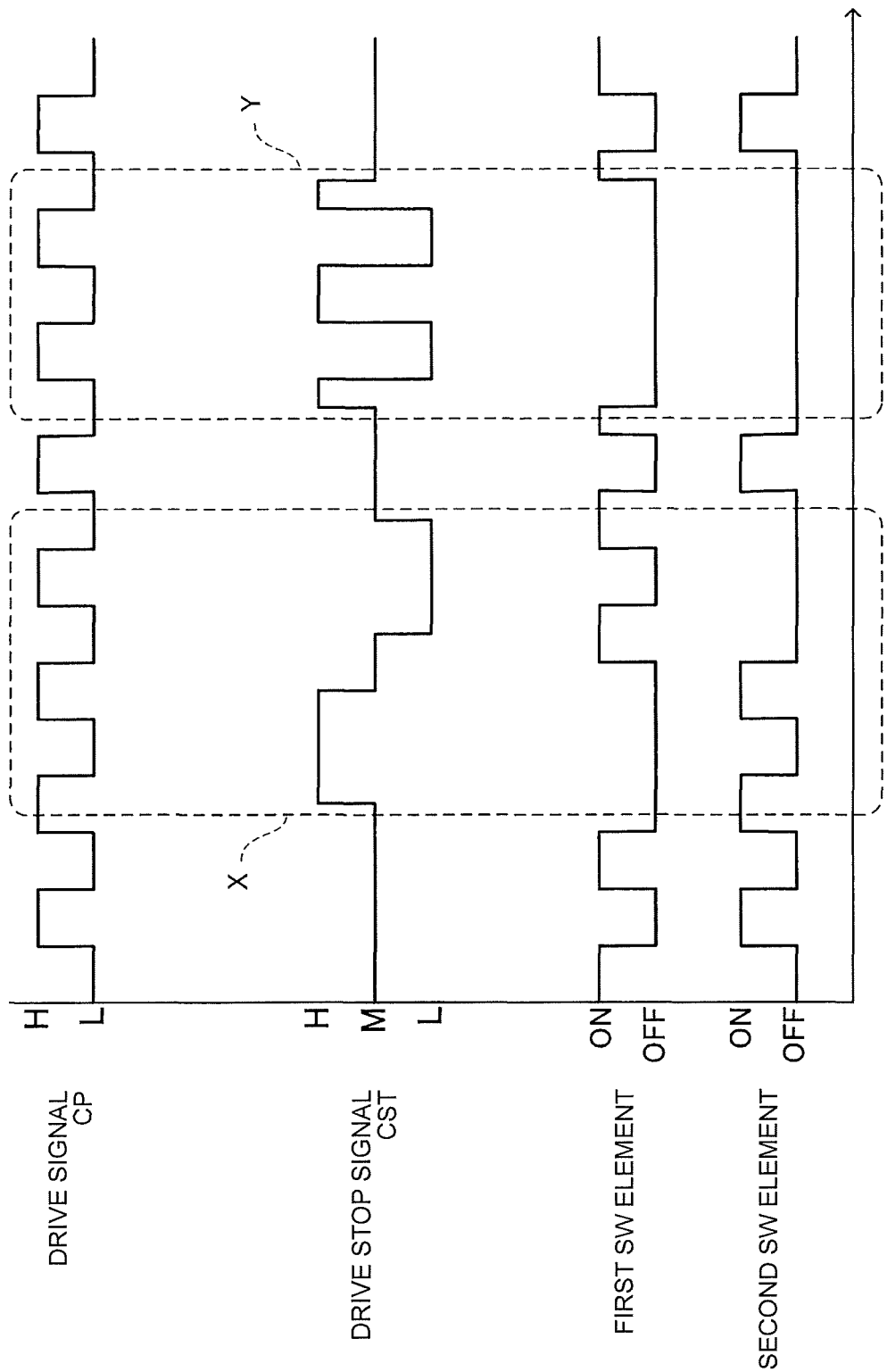

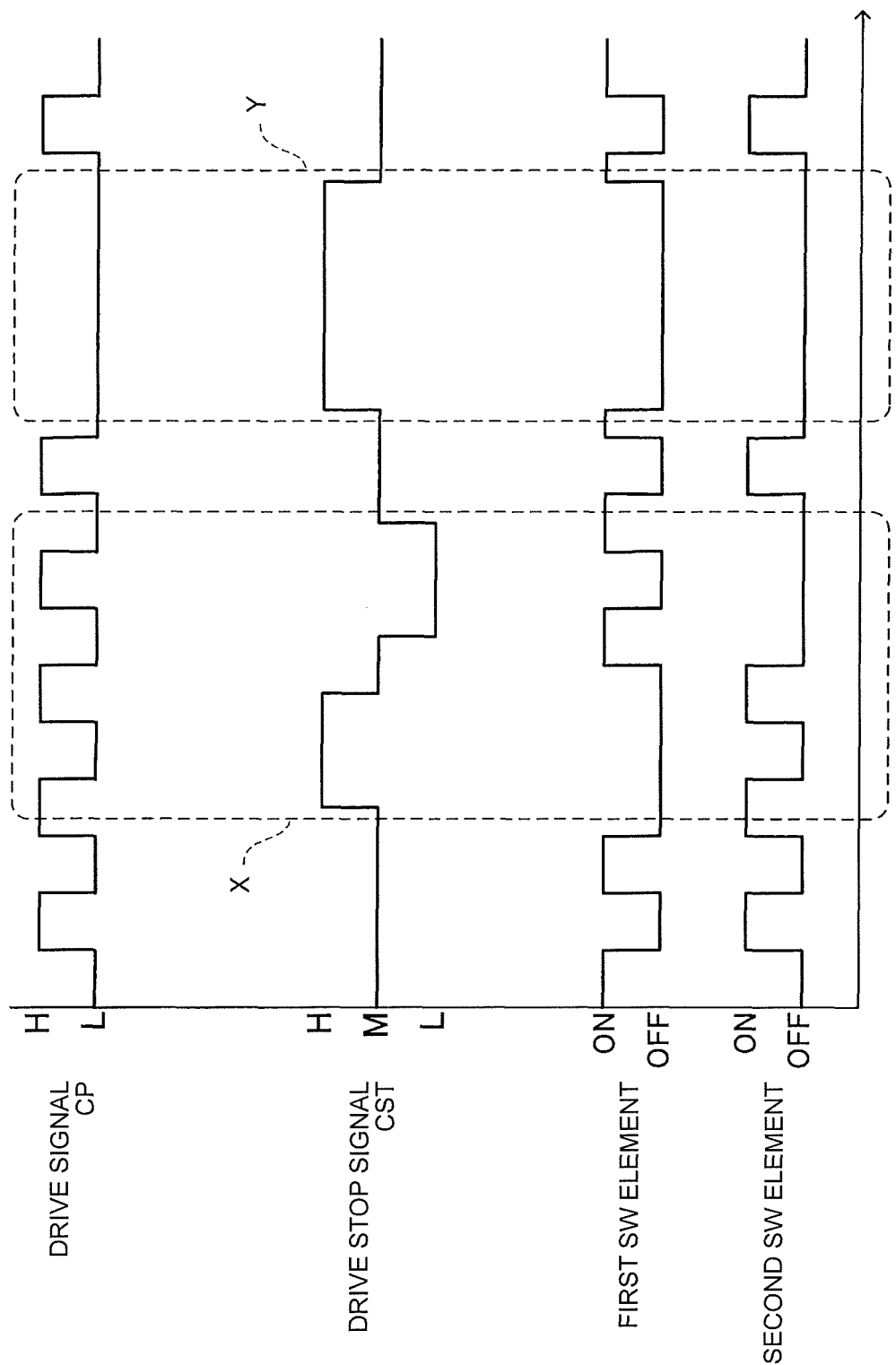

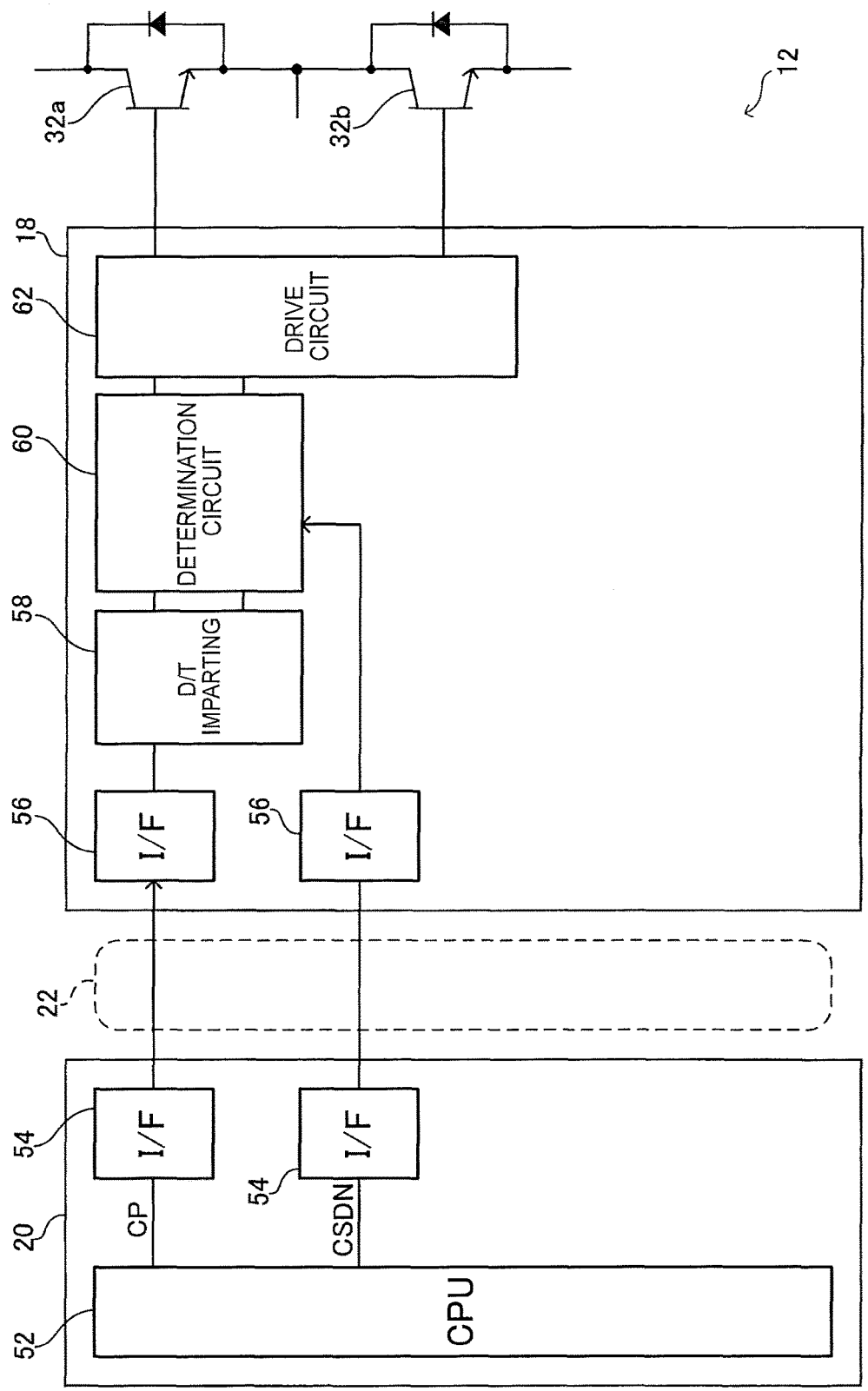

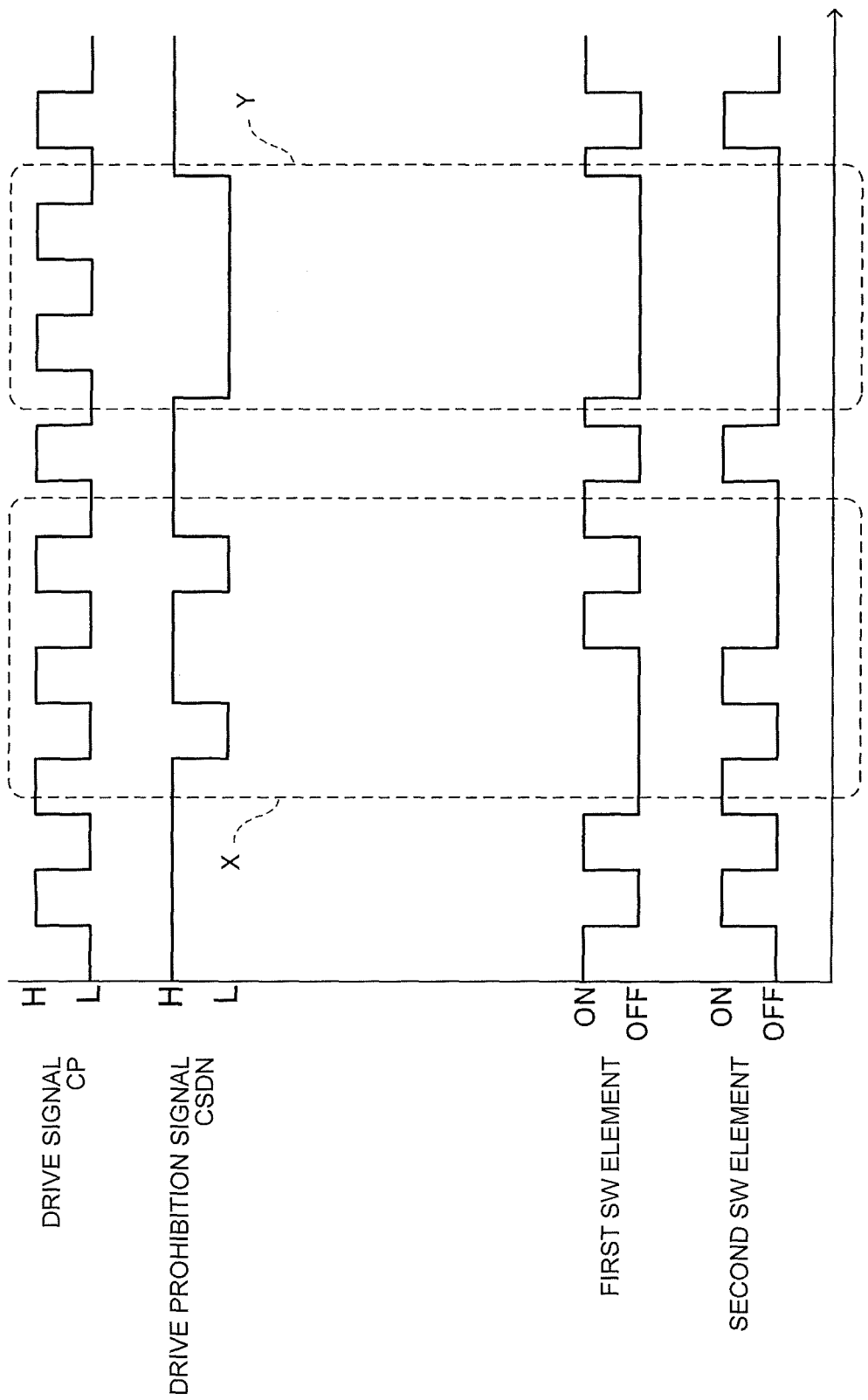

POWER CONVERTER AND CONTROL METHOD OF POWER CONVERTER

INCORPORATION BY REFERENCE

The disclosure of Japanese Patent Application No. 2018-020302 filed on Feb. 7, 2018 including the specification, drawings and abstract is incorporated herein by reference in its entirety.

BACKGROUND

1. Technical Field

A technique disclosed in the present specification relates to a power converter and a control method of a power converter.

2. Description of Related Art

A power converter that converts power between a power supply and a load has been known. The power converter of this type includes: a power conversion circuit (for example, a DC/DC converter and an inverter) having plural switching elements; and an electronic control unit that outputs a control command of the plural switching elements to the power conversion circuit. As an example, Japanese Unexamined Patent Application Publication No. 2008-005625 (JP 2018-005625 A) discloses a power converter including a DC/DC converter and two inverters.

The power conversion circuit including the DC/DC converter and the inverter has a circuit structure in which the two switching elements are connected in series with respect to the power supply. In the case where the two switching elements that are connected in series are simultaneously turned on, a short circuit occurs unintentionally. For this reason, the electronic control unit is configured to output a turn-off drive command (or not to output a turn-on drive command) to one of the switching elements when outputting the turn-on drive command to the other switching element.

SUMMARY

Usually, the drive command to the one switching element and the drive command to the other switching element are sent from the electronic control unit to the power conversion circuit in the form of individual drive signals that are independent of each other. Here, there is a case where a signal line through which one of the drive signals is sent is possibly influenced by noise and the power conversion circuit unintentionally receives the drive command from the signal line that is influenced by the noise. In this case, the two switching elements are possibly turned on simultaneously, which causes the short circuit.

In order to handle the above problem, it can be considered that the electronic control unit selectively outputs the drive command to the one switching element and the drive command to the other switching element in the form of a single drive signal that changes discretely between two values (that is, a binary signal). More specifically, when providing the one switching element with the drive command, the electronic control unit outputs the drive signal at one of the values (for example, a low-level value). When outputting the drive command to the other switching element, the electronic control unit outputs the drive signal at the other value (for example, a high-level value). With such a configuration, even in the case where the signal line, through which the drive signal is sent, is influenced by the noise and the value of the drive signal varies unintentionally, it is possible to avoid the two switching elements from being turned on simultaneously.

However, in the configuration to control the two switching elements by the single drive signal, it is impossible to intermittently turn on only the one switching element. That is, in the case where the drive signal changes discretely and alternately between the two values so as to turn on the one switching element intermittently, the other switching element is also turned on intermittently. In the power converter, the two switching elements do not always have to be turned on alternately, and there is a case where keeping the one switching element off leads to superior energy efficiency. Here, the control to turn on only the one switching element intermittently will be referred to as single-arm switching control. In the configuration in which the single drive signal is adopted, the single-arm switching control cannot be executed.

The present disclosure allows execution of a single-arm switching control while adopting a single drive signal.

A first aspect of the disclosure is a power converter. The power converter includes: a power conversion circuit that includes a first switching element and a second switching element connected in series to the first switching element; and an electronic control unit configured to output plural control commands for the first switching element and the second switching element to the power conversion circuit. The electronic control unit is configured to output a first drive command, a second drive command, a first drive stop command, and a second drive stop command. The first drive command is a command to turn on the first switching element, and the second drive command is a command to turn on the second switching element. The first drive command and the second drive command are selectively output from the electronic control unit in a form of a single drive signal that changes discretely between two values. The first drive stop command is a command to turn off the first switching element regardless of presence or absence of the first drive command, and the second drive stop command is a command to turn off the second switching element regardless of presence or absence of the second drive command.

With the above configuration, the electronic control unit selectively outputs the first drive command to turn on the first switching element and the second drive command to turn on the second switching element by the single drive signal. With such a configuration, even in the case where a signal line through which the drive signal is sent is influenced by noise, and the value of the drive signal varies unintentionally, the two switching elements are not simultaneously turned on. In addition, regardless of the value of the drive signal, the electronic control unit can turn off the first switching element by outputting the first drive stop command and can turn off the second switching element by outputting the second drive stop command. In this way, the electronic control unit can keep turning off one of the switching elements while intermittently turning on the other switching element by further outputting the first drive stop command and the second drive stop command in addition to the drive signal representing the first drive command and the second drive command, for example. That is, single-arm switching control can be executed.

In the power converter, the first drive stop command and the second drive stop command may selectively be output from the electronic control unit in the form of a single drive stop signal that changes discretely between at least two values.

In the power converter, the single drive stop signal may be a signal that changes discretely among three values, and one of the at least three values may represent a command to permit turn-on of the first switching element and the second switching element.

In the power converter, the electronic control unit may be configured to alternately output the first drive command and the second drive command in the form of the single drive signal when turning off both of the first switching element and the second switching element. The electronic control unit may be configured to output the first drive stop command in a period of outputting the first drive command and output the second drive stop command in a period of outputting the second drive command.

In the power converter, the electronic control unit may be configured to execute either one of first control and second control when turning off both of the first switching element and the second switching element. The first control may be control to continuously output both of the first drive command and the first drive stop command. The second control may be control to continuously output both of the second drive command and the second drive stop command.

In the power converter, the power conversion circuit may include a DC-DC converter, and the DC-DC converter may include the first switching element and the second switching element.

A second aspect of the disclosure is a power converter. The power converter includes: a power conversion circuit that includes a first switching element and a second switching element connected in series to the first switching element; and an electronic control unit configured to output plural control commands for the first switching element and the second switching element to the power conversion circuit. The electronic control unit is configured to output a first drive command, a second drive command, and a drive prohibition command. The first drive command is a command to turn on the first switching element, and the second drive command is a command to turn on the second switching element. The first drive command and the second drive command are selectively output from the electronic control unit a the form of a single drive signal that changes discretely between two values. The drive prohibition command is a command to prohibit turn-on of the first switching element and the second switching element regardless of the value of the single drive signal. The electronic control unit is configured to alternately outputting the first drive command and the second drive command in a form of the single drive signal when the electronic control unit intermittently turns on only the first switching element in a state where the second switching element is turned off. The electronic control unit is configured to output the drive prohibition command in a period of outputting the second drive command.

In the power converter, the electronic control unit may be configured to alternately outputting the first drive command and the second drive command in the form of the single drive signal when the electronic control unit intermittently turns on only the second switching element in a state where the first switching element is turned off. The electronic control unit may be configured to output the drive prohibition command in a period of outputting the first drive command.

A third aspect of the disclosure is a control method of a power converter. The power converter includes: a power conversion circuit that includes a first switching element and a second switching element connected in series to the first switching element; and an electronic control unit configured to output plural control commands for the first switching element and the second switching element to the power conversion circuit. The control method includes outputting, by the electronic control unit, a first drive command, a second drive command, a first drive stop command, and a second drive stop command. The first drive command is a command to turn on the first switching element, and the second drive command is a command to turn on the second switching element. The first drive command and the second drive command are selectively output from the electronic control unit in a form of a single drive signal that changes discretely between two values. The first drive stop command is a command to turn off the first switching element regardless of presence or absence of the first drive command, and the second drive stop command is a command to turn off the second switching element regardless of presence or absence of the second drive command.

With the above configuration, the electronic control unit can keep turning off one of the switching elements while intermittently turning on the other switching element by further outputting the first drive stop command and the second drive stop command in addition to the drive signal representing the first drive command and the second drive command, for example. That is, single-arm switching control can be executed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a block diagram of configurations of an electronic control unit 20 and a drive circuit unit 18 in the first embodiment;

FIG. 4 is a table showing relationships between plural control signals and representing control commands thereof in the first embodiment;

FIG. 5 is a time chart showing states of the plural control signals and two switching elements 32a, 32b in the first embodiment;

FIG. 8 is a table showing relationships between plural control signals and representing control commands thereof in the second embodiment;

FIG. 11 is a time chart showing states of plural control signals and two switching elements 32a, 32b in the third embodiment;

FIG. 12 is another time chart showing the states of the plural control signals and the two switching elements 32a, 32b in the third embodiment;

FIG. 13 is a block diagram of configurations of an electronic control unit 20 and a drive circuit unit 18 in a fourth embodiment; and FIG. 14 is a time chart showing states of plural control signals and two switching elements 32a, 32b in the fourth embodiment.

DETAILED DESCRIPTION OF EMBODIMENTS

Figure 1:
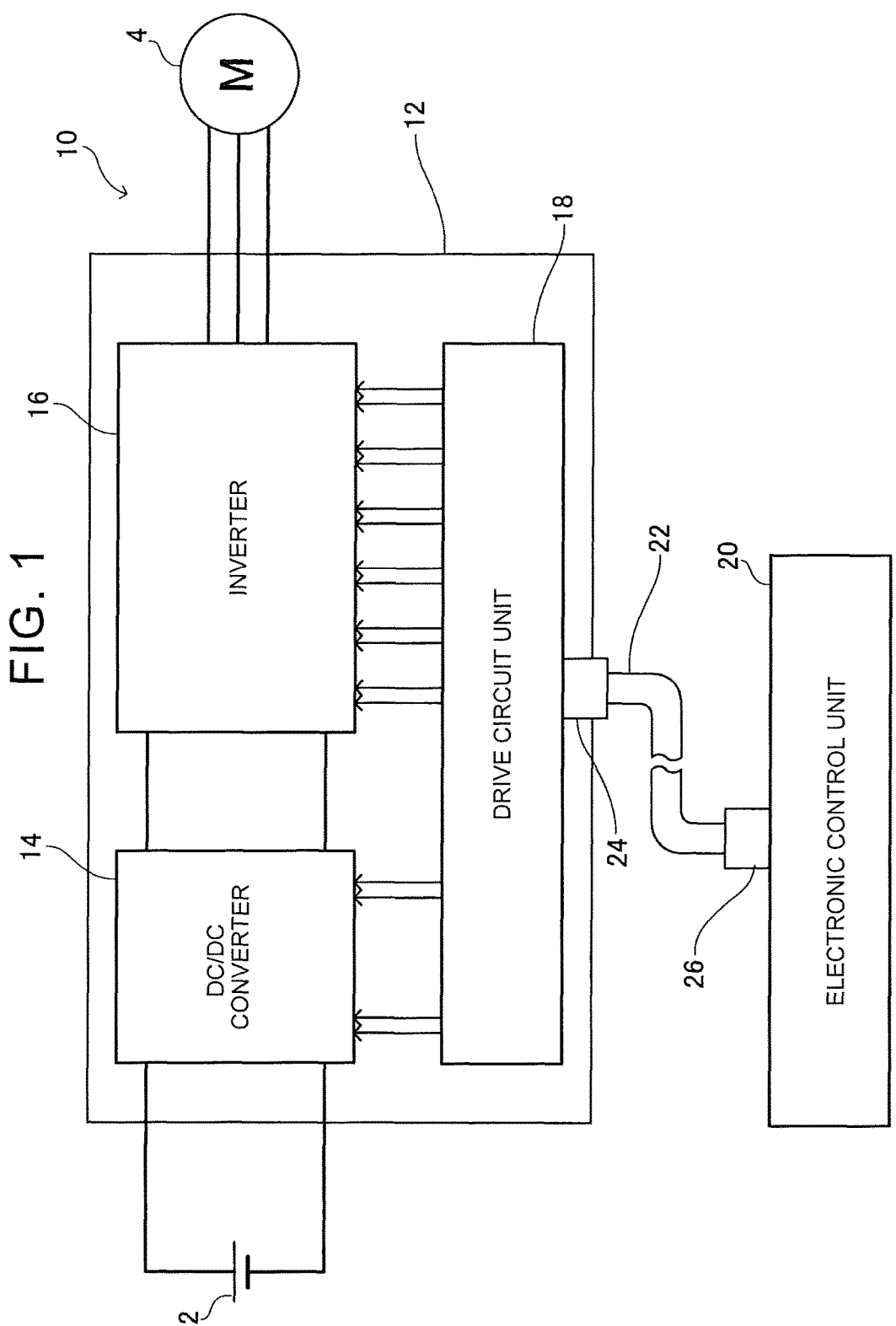
FIG. 1 is a block diagram of a configuration of a power converter 10 in a first embodiment.

In an aspect of the present technique, a first drive stop command and a second drive stop command may selectively be output from an electronic control unit in the form of a single drive stop signal that changes discretely between at least two values. With such a configuration, a first switching element can be kept off by maintaining the single drive stop signal to a value indicated by the first drive stop command, for example. Alternatively, a second switching element can be kept off when the single drive stop signal is maintained to a value indicated by the second drive stop command. Furthermore, in the case where the drive stop signal is synchronized with the drive signal, which changes discretely between the two values, and thus changes discretely between the two values, the two switching elements can alternately be turned on, or both of the two switching elements can keep turned off.

The single drive stop signal described above may be a signal that changes discretely among at least three values. In this case, one of the at least three values preferably represents a command to permit turn-on of the first switching element and the second switching element. With such a configuration, when the control to alternately turn on the two switching elements is executed, the drive stop signal does not have to fluctuate in synchronization with the drive signal.

In the embodiment of the present technique, in the case where both of the first switching element and the second switching element are turned off, the electronic control unit may alternately output a first drive command and a second drive command in the form of the drive signal, may output the first drive stop command in a period of outputting the first drive command, and may output the second drive stop command in a period of outputting the second drive command. By such combinations of the commands, even in the case where the drive signal is a binary signal representing the first drive command or the second drive command, it is possible to keep turning off both of the first switching element and the second switching element.

Instead of the above-described configuration, when both of the first switching element and the second switching element are turned off, the electronic control unit may continuously output both of the first drive command and the first drive stop command, or may continuously output both of the second drive command and the second drive stop command. Also, by such combinations of the commands, it is possible to keep turning off both of the first switching element and the second switching element.

In the embodiment of the present technique, a power conversion circuit may include a DC/DC converter, and the first switching element and the second switching element may constitute a part of the DC/DC converter. Alternatively, as another embodiment, the power conversion circuit may include an inverter, and the first switching element and the second switching element may constitute a part (for example, a pair of upper and lower arms) of the inverter.

A description will be made on a power converter 10 of a first embodiment with reference to the accompanying drawings. The power converter 10 of this embodiment is mounted on an automobile such as a hybrid vehicle, a fuel cell vehicle, or an electric vehicle and converts power between a battery 2 and a motor 4 for driving wheels. Note that a technique disclosed in this embodiment is not only adopted for the power converter 10 mounted on the automobile but can also be adopted for power converters for various applications.

The motor 4 functions as an electric prime mover and also functions as a generator. When the motor 4 functions as the electric motor, the power is supplied from the battery 2 to the motor 4 through the power converter 10. In this case, the battery 2 is a power supply, and the motor 4 is a load. Meanwhile, when the motor 4 functions as the generator, the power is supplied from the motor 4 to the battery 2 through the power converter 10. In this case, the motor 4 is the power supply, and the battery 2 is the load.

As shown in FIG. 1, the power converter 10 includes a power conversion module 12 and an electronic control unit 20 that provides the power conversion module 12 with plural control commands. The electronic control unit 20 is connected to the power conversion module 12 via a signal cable 22 having plural signal lines. Connectors 24, 26 are provided on both ends of the signal cable 22, and the signal cable 22 is detachably connected to the power conversion module 12 and the electronic control unit 20. However, a connection structure between the power conversion module 12 and the electronic control unit 20 is not particularly limited and can appropriately be changed.

The power conversion module 12 includes a DC/DC converter 14, an inverter 16, and a drive circuit unit 18. The DC/DC converter 14 is provided between the battery 2 and the inverter 16. The DC/DC converter 14 is a buck-boost DC/DC converter and can step up and down a voltage of DC power between the battery 2 and the inverter 16. The inverter 16 is provided between the DC/DC converter 14 and the motor 4. The inverter 16 is a three-phase inverter and can convert the DC power to three-phase AC power and vice versa between the DC/DC converter 14 and the motor 4. Although a detail will be described below, each of the DC/DC converter 14 and the inverter 16 is an example of a power conversion circuit having a circuit structure in which two switching elements are connected in series with respect to the power supply.

For example, in the case where the motor 4 functions as the electric motor, a voltage of the DC power supplied from the battery 2 is stepped up in the DC/DC converter 14. Then, the DC power is further converted to the three-phase AC power in the inverter 16 before being supplied to the motor 4. In this way, the three-phase AC motor 4 is driven by using the DC power supplied from the battery 2. Meanwhile, in the case where the motor 4 functions as the generator, the three-phase AC power supplied from the motor 4 is converted to the DC power in the inverter 16. Then, the voltage of the DC power is further stepped down in the DC/DC converter 14 before being supplied to the battery 2. In this way, the power generated by the motor 4 is stored in the battery 2.

Figure 2:
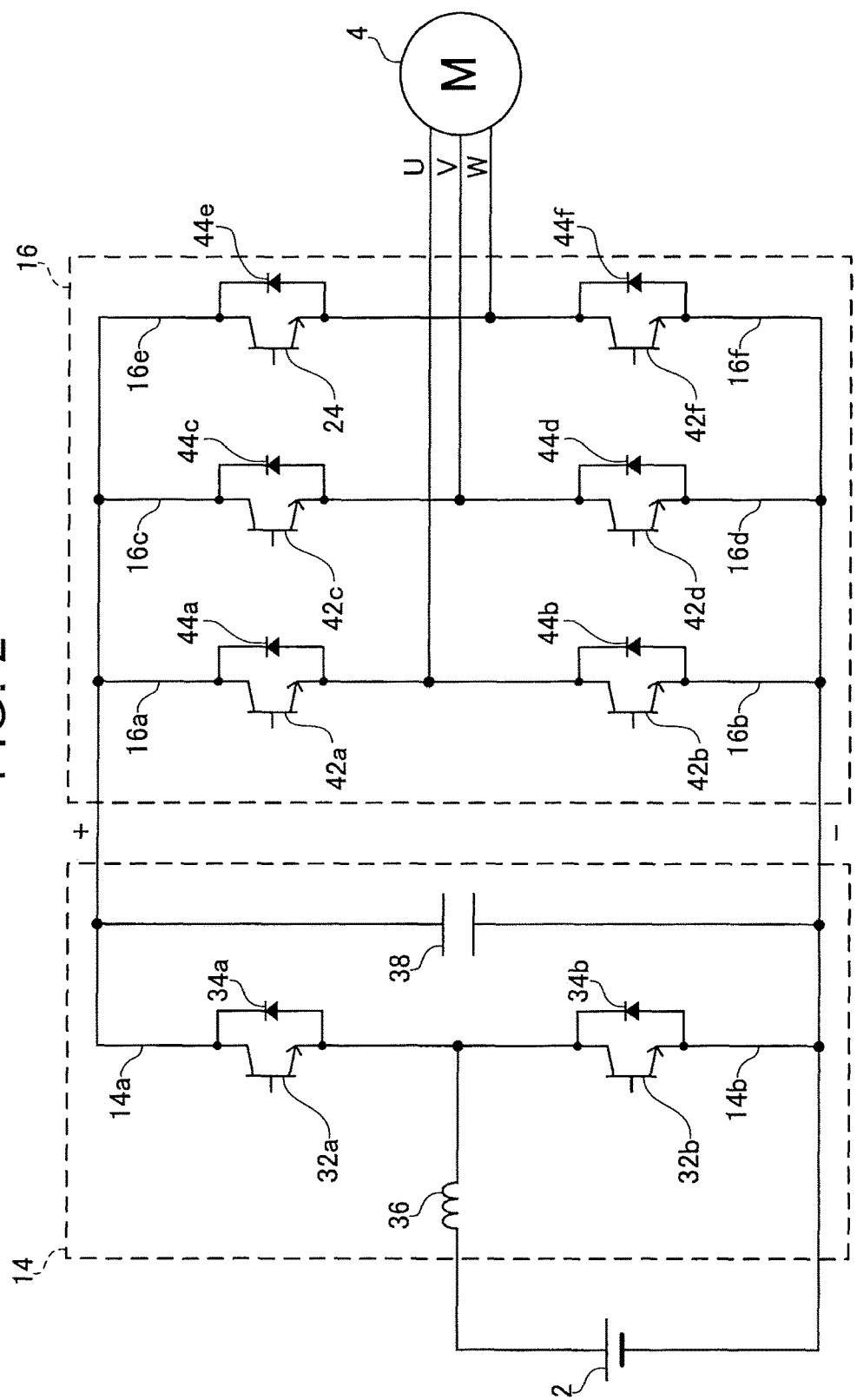
FIG. 2 is a view of a circuit structure of each of a DC/DC converter 14 and an inverter 16.

FIG. 2 shows an example of the circuit structure of each of the DC/DC converter 14 and the inverter 16. As shown in FIG. 2, the DC/DC converter 14 and the inverter 16 are configured to use plural switching elements 32a to 32b and plural switching elements 42a to 42f, respectively. Each of the switching elements 32a to 32b, 42a to 42f is provided on a power supply path between the battery 2 and the motor 4, and an operation (that is, switching) thereof is controlled by the drive circuit unit 18. Although a detail will be described below, the drive circuit unit 18 controls the switching elements 32a to 32b of the DC/DC converter 14 and the switching elements 42a to 42f of the inverter 16 on the basis of the plural control commands from the electronic control unit 20. A specific configuration of each of the switching elements 32a to 32b, 42a to 42f is not particularly limited and may be a MOSFET or an IGBT, for example. In addition, a semiconductor material adopted for a semiconductor switch of each of those is not particularly limited, either, and may be a silicon (Si), silicon carbide (SiC), or nitride semiconductor, for example.

Configurations of the DC/DC converter 14 and the inverter 16 are in common with those of the known DC/DC converter and the known inverter. For example, the DC/DC converter 14 has the two switching elements 32a, 32b, an inductor 36, and a smoothing capacitor 38. The one switching element 32a is provided on an upper arm 14a of the DC/DC converter 14, and the other switching element 32b is provided on a lower arm 14b of the DC/DC converter 14. Diodes 34a, 34b are respectively connected to the switching elements 32a, 32b in anti-parallel relationships. Note that, in the arms 14a, 14b, the switching elements 32a, 32b and the diodes 34a, 34b may be configured by using single RC-IGBTs. Hereinafter, the switching element 32a located on the upper arm 14a will be referred to as a first switching element 32a, and the switching element 32b located on the lower arm 14b will be referred to as a second switching element 32b.

When the first switching element 32a is intermittently turned on, the DC/DC converter 14 functions as a buck converter. At this time, the second switching element 32b may keep turned off or may be turned on intermittently in synchronization with turn-off of the first switching element 32a. In the latter case (in the case where the second switching element 32b is also intermittently turned on), charge/discharge loss of a gate voltage of the first switching element 32a can be reduced. Thus, in the power converter 10 of this embodiment, when the DC/DC converter 14 functions as the buck converter, the two switching elements 32a, 32b are usually turned on alternately. However, in the case where driving of the second switching element 32b is unnecessary, only the first switching element 32a is intermittently turned on in a state where the second switching element 32b keeps turned off. Just as described, control to intermittently turn on only one of the two switching elements 32a, 32b will herein be referred to as single-arm switching control.

Meanwhile, when the DC/DC converter 14 functions as a booster converter, the second switching element 32b is intermittently turned on. At this time, the first switching element 32a may keep turned off or may be turned on intermittently in synchronization with turn-off of the second switching element 32b. In regard to this point, the operation of the DC/DC converter 14 is in common with the above operation when the DC/DC converter 14 functions as the buck converter. Thus, in the power converter 10 of this embodiment, also when the DC/DC converter 14 functions as the booster converters, the two switching elements 32a, 32b are usually turned on alternately. However, in the case where driving of the first switching element 32a is unnecessary, the single-arm switching control in which only the second switching element 32b is intermittently turned on is executed. Note that, since the two switching elements 32a, 32b are connected in series in the DC/DC converter 14, regardless of the step-up/down operations thereof, it is required to prohibit those switching elements 32a, 32b from being turned on simultaneously.

The inverter 16 has the six switching elements 42a to 42f. The switching elements 42a to 42f are respectively provided on a U-phase upper arm 16a, a U-phase lower arm 16b, a V-phase upper arm 16c, a V-phase lower arm 16d, a W-phase upper arm 16e, and a W-phase lower arm 16f. The inverter 16 converts the DC power to the AC power or converts the AC power to the DC power by selectively switching the six switching elements 42a to 42f. Here, in the inverter 16, because the two switching elements 42a, 42b that are provided on the U-phase upper and lower arms 16a, 16b are connected in series, it is required to prohibit those switching elements 42a, 42b from being turned on simultaneously. The same applies to the two switching elements 42c, 42d that are provided on the V-phase upper and lower arms 16c, 16d and the two switching elements 42e, 42f that are provided on the W-phase upper and lower arms 16e, 16f. Note that the configuration of each of the DC/DC converter 14 and the inverter 16 described herein is merely one example and thus can appropriately be changed. In addition, as another embodiment, the power converter 10 may only have the DC/DC converter 14 or may only have the inverter 16.

A description will be made on a mode in which the electronic control unit 20 controls the two switching elements 32a, 32b of the DC/DC converter 14 with reference to FIG. 3 to FIG. 6. As shown in FIG. 3, the electronic control unit 20 has a processor (a CPU) 52 and plural interfaces 54, and outputs plural control signals CP, CSDN, CSTP, CSTN to the drive circuit unit 18 of the power conversion module 12. The plural control signals CP, CSDN, CSTP, CSTN include a drive signal CP, a drive prohibition signal CSDN, a first drive stop signal CSTP, and a second drive stop signal CSTN. As an example, the plural control signals CP, CSDN, CSTP, CSTN are generated by the processor 52, and each of the control signals CP, CSDN, CSTP, CSTN is output to the power conversion module 12 via the corresponding interface 54. The control signals CP, CSDN, CSTP, CSTN that are output from the electronic control unit 20 are sent through the signal cable 22 and are received by the drive circuit unit 18 of the power conversion module 12.

FIG. 4 shows control commands assigned to the control signals CP, CSDN, CSTP, CSTN. The drive signal CP is a binary signal that changes discretely between two values (a high-level value and a low-level value herein). The high-level drive signal CP represents the second drive command, and the low-level drive signal CP represents the first drive command. Here, the first drive command is a command to turn on the first switching element 32a. The second drive command is a command to turn on the second switching element 32b. Just as described, the electronic control unit 20 in this embodiment is configured to selectively output the first drive command and the second drive command in the form of the single drive signal CP. That is, when setting the drive signal CP to the high-level value, the electronic control unit 20 can provide the drive circuit unit 18 with the second drive command and thus can turn on the second switching element 32b only. Meanwhile, when setting the drive signal CP to the low-level value, the electronic control unit 20 can provide the drive circuit unit 18 with the first drive command and thus can turn on the first switching element 32a only.

The drive prohibition signal CSDN is a binary signal that changes discretely between the two values (the high-level value and the low-level value herein). The high-level drive prohibition signal CSDN represents a drive permission command, and the low-level drive prohibition signal CSDN represents a drive prohibition command. The drive permission command is a command to permit turn-on of the two switching elements 32a, 32b, and the drive prohibition command is a command to prohibit turn-on of the two switching elements 32a, 32b. When setting the drive prohibition signal CSDN to the high-level value, the electronic control unit 20 can provide the drive circuit unit 18 with the drive permission command and thus can turn on the two switching elements 32a, 32b. Meanwhile, when setting the drive prohibition signal CSDN to the low-level value, the electronic control unit 20 can provide the drive circuit unit 18 with the drive prohibition command and thus can prohibit turn-on of the two switching elements 32a, 32b.

The first drive stop signal CSTP is a binary signal that changes discretely between the two values (the high-level value and the low-level value herein). The high-level first drive stop signal CSTP represents the first drive stop command, and the low-level first drive stop signal CSTP represents a first drive permission command. The first drive permission command is a command to permit turn-on of the first switching element 32a. Meanwhile, the first drive stop command is a command to turn off the first switching element 32a regardless of the drive signal CP. When setting the first drive stop signal CSTP to the low-level value, the electronic control unit 20 can provide the drive circuit unit 18 with the first drive permission command. In this case, the first switching element 32a is turned on in accordance with the first drive command represented by the drive signal CP (that is, in accordance with the low-level drive signal CP). Alternatively, when setting the first drive stop signal CSTP to the high-level value, the electronic control unit 20 can provide the drive circuit unit 18 with the first drive stop command. In this case, the first switching element 32a keeps turned off even when the drive signal CP represents the first drive command (that is, even when the drive signal CP is in the low level).

The second drive stop signal CSTN is a binary signal that changes discretely between the two values (the high-level value and the low-level value herein). The high-level second drive stop signal CSTN represents the second drive stop command, and the low-level second drive stop signal CSTN represents a second drive permission command. The second drive permission command is a command to permit turn-on of the second switching element 32b. Meanwhile, the second drive stop command is a command to turn off the second switching element 32b regardless of the drive signal CP. When setting the second drive stop signal CSTN to the low-level value, the electronic control unit 20 can provide the drive circuit unit 18 with the second drive permission command. In this case, the second switching element 32b is turned on in accordance with the second drive command represented by the drive signal CP (that is, in accordance with the high-level drive signal CP). Alternatively, when setting the second drive stop signal CSTN to the high-level value, the electronic control unit 20 can provide the drive circuit unit 18 with the second drive stop command. In this case, the second switching element 32b keeps turned off even when the drive signal CP represents the second drive command (that is, even when the drive signal CP is in the high level).

The drive circuit unit 18 controls the two switching elements 32a, 32b in accordance with the plural control signals CP, CSDN, CSTP, CSTN, more precisely, in accordance with the plural control commands represented by the plural control signals CP, CSDN, CSTP, CSTN. A specific configuration of the drive circuit unit 18 is not particularly limited. As an example, the drive circuit unit 18 in this embodiment has plural interfaces 56, a dead time imparting circuit 58, a determination circuit 60, and a drive circuit 62.

The drive signal CP is received by the dead time imparting circuit 58 via the corresponding interface 56. The dead time imparting circuit 58 outputs the first drive command or the second drive command to the determination circuit 60 in accordance with the signal value (the high-level value/the low-level value) of the drive signal CP. At this time, the dead time imparting circuit 58 provides dead time (a time interval) when switching between the first drive command and the second drive command, and thereby prevents the two switching elements 32a, 32b from being turned on simultaneously.

The drive prohibition signal CSDN, the first drive stop signal CSTP, and the second drive stop signal CSTN are received by the determination circuit 60 via the corresponding interfaces 56. In the determination circuit 60, the first drive command and the second drive command from the dead time imparting circuit 58 are either blocked or sent to the drive circuit 62 in accordance with the control commands represented by the drive prohibition signal CSDN, the first drive stop signal CSTP, and the second drive stop signal CSTN. For example, in the case where the drive prohibition signal CSDN represents the drive prohibition command (that is, the low-level value), both of the first drive command and the second drive command are blocked in the determination circuit 60. In the case where the first drive stop signal CSTP represents the first drive stop command (that is, the high-level value), only the first drive command is blocked in the determination circuit 60. In the case where the second drive stop signal CSTN represents the second drive stop command (that is, the high-level value), only the second drive command is blocked in the determination circuit 60. In the rest of the cases, the first drive command and the second drive command from the dead time imparting circuit 58 are sent to the drive circuit 62. The drive circuit 62 turns on the first switching element 32a while receiving the first drive command, and turns on the second switching element 32b while receiving the second drive command.

From the configuration that has been described so far, the drive circuit unit 18 is configured to turn on the first switching element 32a while receiving the first drive command (the low-level drive signal CP) from the electronic control unit 20 and to turn on the second switching element 32b while receiving the second drive command (the high-level drive signal CP). However, the drive circuit unit 18 is configured to prioritize the first drive stop command (the high-level first drive stop signal CSTP) over the first drive command when receiving the first drive stop command from the electronic control unit 20 and thereby turn off the first switching element 32a. Similarly, the drive circuit unit 18 is configured to prioritize the second drive stop command (the high-level second drive stop signal CSTN) over the second drive command when receiving the second drive stop command from the electronic control unit 20 and thereby turn off the second switching element 32b. Furthermore, the drive circuit unit 18 is configured to prioritize the drive prohibition command (the low-level drive prohibition signal CSDN) over the first drive command and the second drive command when receiving the drive prohibition command from the electronic control unit 20 and thereby inhibit turn-on of the two switching elements 32a, 32b.

As shown in FIG. 5, the electronic control unit 20 can control the two switching elements 32a, 32b in various aspects by the above-described plural control signals CP, CSDN, CSTP, CSTN. For example, the electronic control unit 20 can alternately turn on the first switching element 32a and the second switching element 32b by alternately switching the value of the drive signal CP between the low-level value and the high-level value. As described above, the low-level drive signal CP represents the first drive command to turn on the first switching element 32a, and the high-level drive signal CP represents the second drive command to turn on the second switching element 32b. The first drive command and the second drive command are selectively output in the form of the single drive signal CP. Thus, even in the case where the signal line through which the drive signal CP is sent in the signal cable 22 is influenced by noise, and the value of the drive signal CP is changed unintentionally, the two switching elements 32a, 32b are not turned on simultaneously.

In addition, as indicated by a period X in FIG. 5, the electronic control unit 20 can keep turning off the first switching element 32a by outputting the first drive stop command (that is, the high-level first drive stop signal CSTP). Furthermore, the electronic control unit 20 can keep turning off the second switching element 32b by outputting the second drive stop command (that is, the high-level second drive stop signal CSTN). In this way, the electronic control unit 20 can execute the single-arm switching control to intermittently turn on the first switching element 32a or the second switching element 32b only when necessary. Moreover, as indicated by a period Y in FIG. 5, the electronic control unit 20 can keep turning off both of the two switching elements 32a, 32b by outputting the drive prohibition command (that is, the low-level drive prohibition signal CSDN). Just as described, even in the case where the power converter 10 in this embodiment is configured to control the two switching elements 32a, 32b by the single drive signal CP, it is possible to execute the single-arm switching control to intermittently turn on only one of the two switching elements 32a, 32b.

Figure 6:
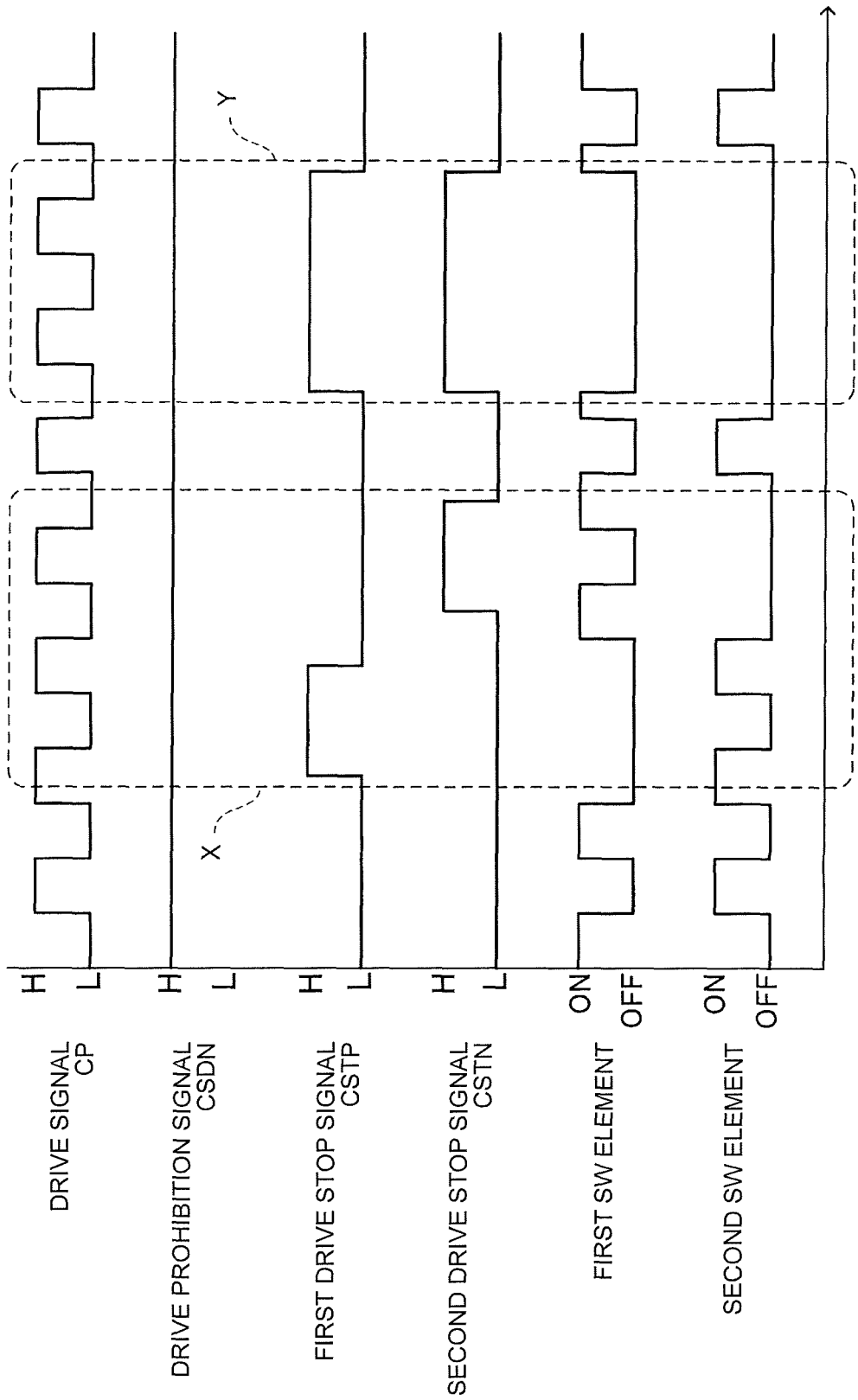
FIG. 6 is another time chart showing the states of the plural control signals and the two switching elements 32a, 32b in the first embodiment.

Here, as shown in FIG. 6, the electronic control unit 20 can also prohibit turn-on of the two switching elements 32a, 32b by simultaneously outputting the first drive stop command (that is, the high-level first drive stop signal CSTP) and the second drive stop command (that is, the high-level second drive stop signal CSTN) (a period Y in FIG. 6). That is, the electronic control unit 20 can prohibit turn-on of the two switching elements 32a, 32b even without outputting the drive prohibition command (the low-level drive prohibition signal CSDN). Thus, the electronic control unit 20 does not always have to output the drive prohibition signal, and a configuration related to the output of the drive prohibition signal may not be provided.

As described above, also in the inverter 16, it is required to prohibit simultaneous turn-on of the two switching elements that are connected in series of the plural switching elements 42a to 42f, and the single-arm switching control is preferably executed on these two switching elements when necessary. Thus, the above-described technique can effectively be adopted for the control of the switching elements 42a to 42f in the inverter 16. This applies to other embodiments, which will be described below.

Figure 7:
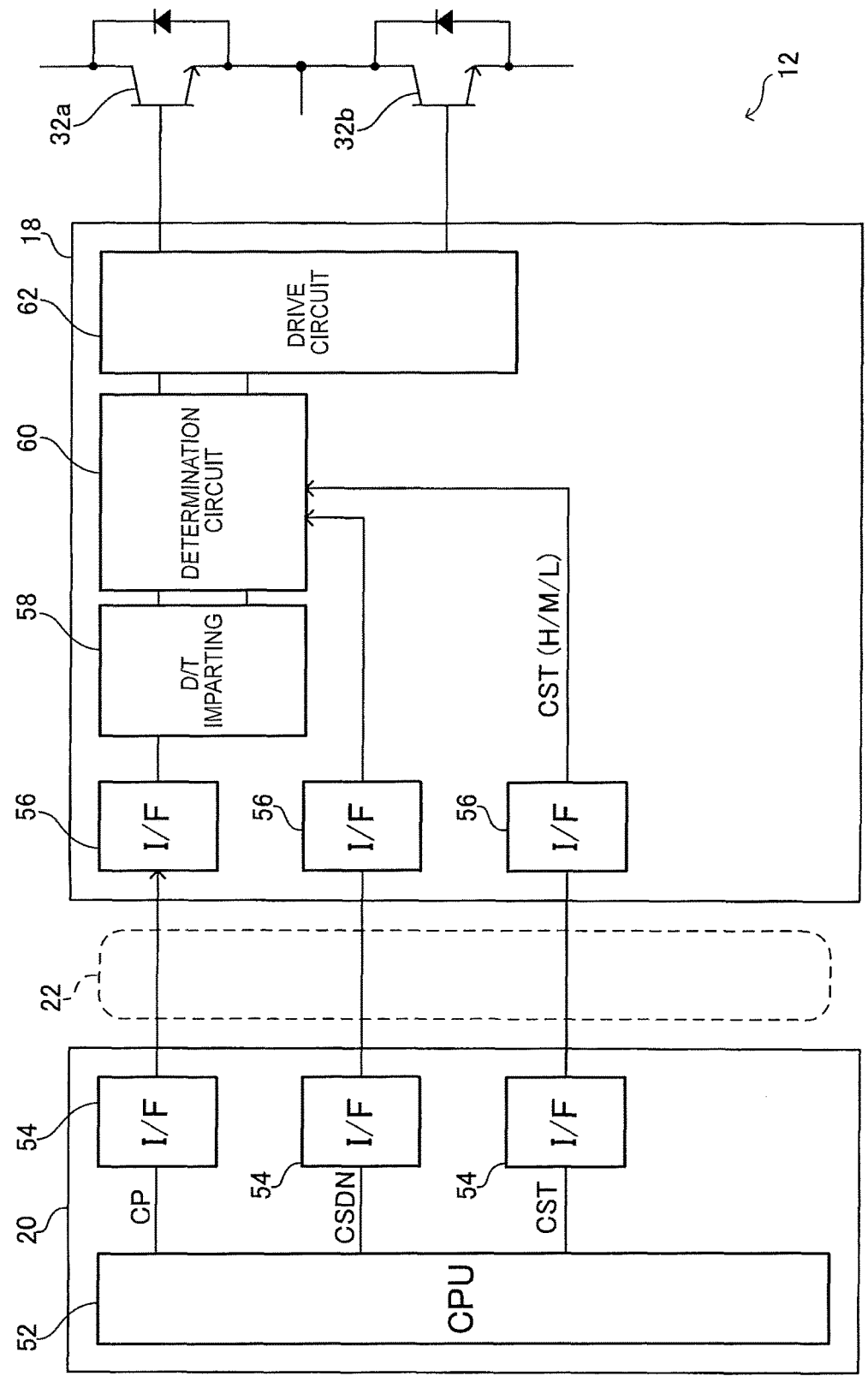
FIG. 7 is a block diagram of configurations of an electronic control unit 20 and a drive circuit unit 18 in a second embodiment.

A description will be made on a power converter of a second embodiment with reference to FIG. 7 to FIG. 9. Compared to the power converter 10 in the first embodiment, in the power converter in this embodiment, the control signals output by the electronic control unit 20 are changed. In detail, the electronic control unit 20 in this embodiment is configured to output a single drive stop signal CST instead of the first drive stop signal CSTP and the second drive stop signal CSTN. The rest of the configuration is in common with that in the first embodiment. Thus, an overlapping description will not be made herein.

As shown in FIG. 8, the drive stop signal CST is a ternary signal that changes discretely among three values (the high-level value, a middle level value, and the low-level value herein). The high-level drive stop signal CST represents the first drive stop command, the middle-level drive stop signal CST represents the drive permission command, and the low-level drive stop signal CST represents the second drive stop command. As described above, the first drive stop command is the command to turn off the first switching element 32a regardless of the drive signal CP. The second drive stop command is the command to turn off the second switching element 32b regardless of the drive signal CP. The drive permission command is the command to permit turn-on of the two switching elements 32a, 32b. That is, in this embodiment, it is configured to output the first drive stop command and the second drive stop command in the form of the single drive stop signal CST and send the first drive stop command and the second drive stop command to the drive circuit unit 18.

Figure 9:
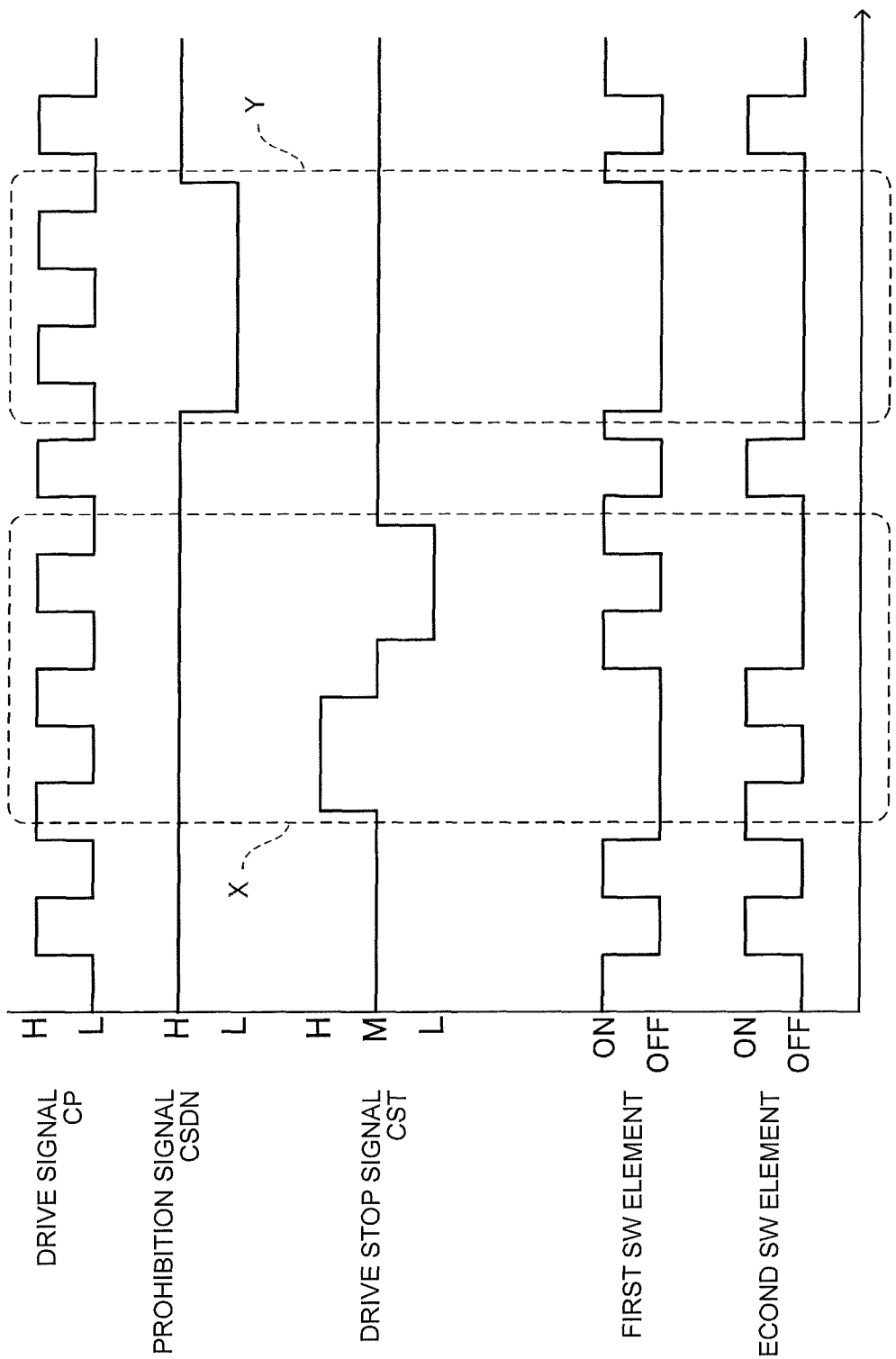
FIG. 9 is a time chart showing states of the plural control signals and two switching elements 32a, 32b in the second embodiment.

As shown in FIG. 9, the electronic control unit 20 in this embodiment can also keep turning off the first switching element 32a by outputting the first drive stop command (that is, the high-level drive stop signal CST). In addition, the electronic control unit 20 can keep turning off the second switching element 32b by outputting the second drive stop command (that is, the low-level drive stop signal CST). In this way, the electronic control unit 20 can execute the single-arm switching control to intermittently turn on the first switching element 32a or the second switching element 32b only when necessary (a period X in FIG. 9). Note that in the case where the two switching elements 32a, 32b are alternately turned off, the electronic control unit 20 only has to output the drive permission command (that is, the middle-level drive stop signal CST).

With the configuration of this embodiment, the first drive stop command and the second drive stop command are output and sent in the form of the single drive stop signal CST. Thus, it is possible to simplify the configurations of the electronic control unit 20 and the drive circuit unit 18 and the configuration of the cable 22 that mutually connects the electronic control unit 20 and the drive circuit unit 18. Alternatively, the signal line used for the second drive stop signal CSTN in the signal cable 22 can be used for another application.

Figure 10:
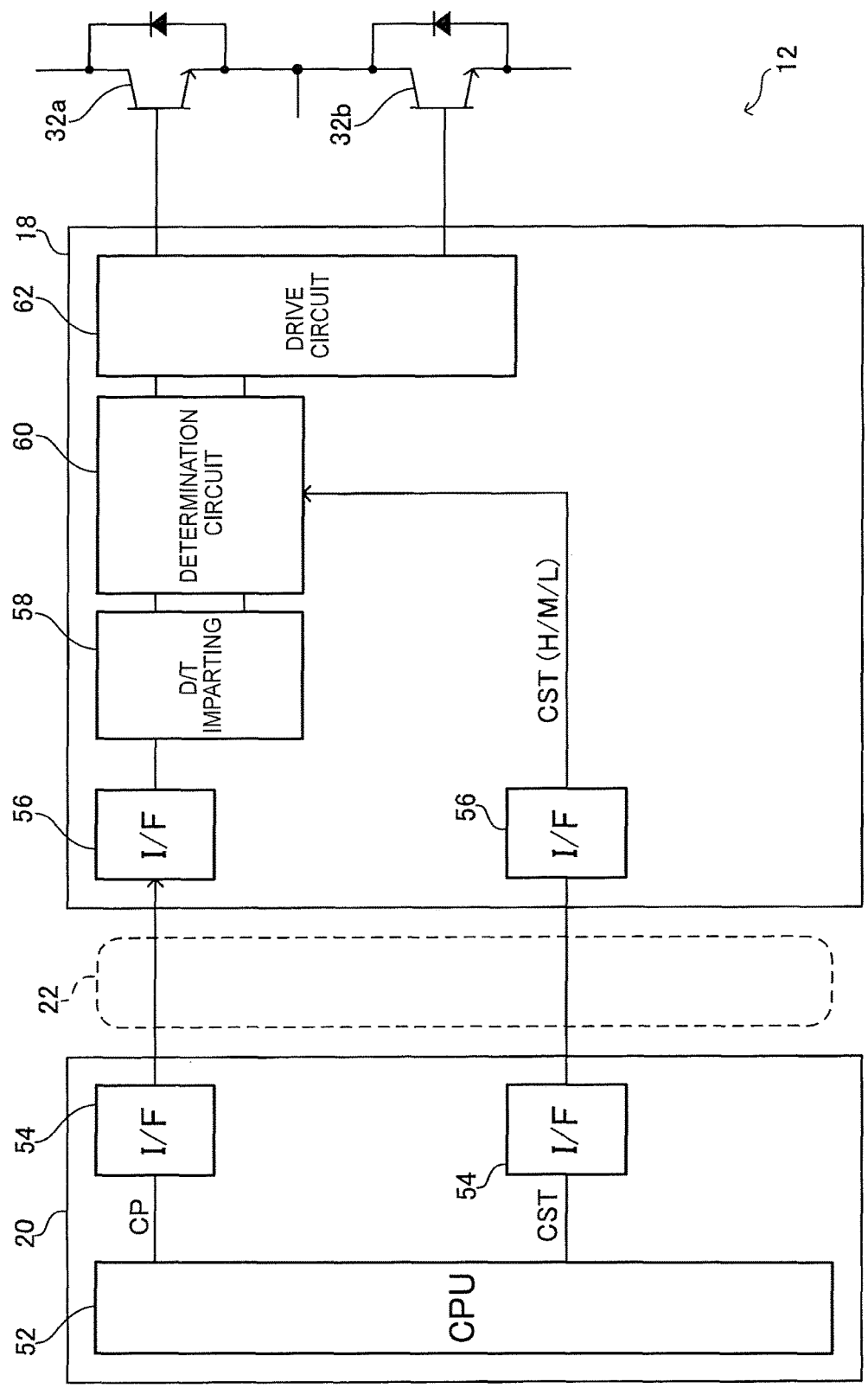
FIG. 10 is a block diagram of configurations of an electronic control unit 20 and a drive circuit unit 18 in a third embodiment.

A description will be made on a power converter of a third embodiment with reference to FIG. 10 to FIG. 12. Compared to the power converter in the second embodiment, in the power converter in this embodiment, the control signals output by the electronic control unit 20 are changed. In detail, the electronic control unit 20 in this embodiment is not configured to output the drive prohibition signal CSDN and thus differs from the electronic control unit 20 in the second embodiment in this point. The rest of the configuration is in common with that in the second embodiment. Thus, an overlapping description will not be made herein.

As shown in FIG. 11, the electronic control unit 20 in this embodiment can also keep turning off the first switching element 32a by outputting the first drive stop command (that is, the high-level drive stop signal CST). In addition, the electronic control unit 20 can keep turning off the second switching element 32b by outputting the second drive stop command (that is, the low-level drive stop signal CST). In this way, the electronic control unit 20 can execute the single-arm switching control to intermittently turn on the first switching element 32a or the second switching element 32b only when necessary (a period X in FIG. 11). In addition, as indicated by a period Y in FIG. 11, in the case where the drive stop signal CST changes discretely between the two values (the low-level value and the high-level value) in synchronization with the drive signal CP that changes discretely between the two values (the low-level value and the high-level value), the two switching elements 32a, 32b can keep turned off simultaneously.

Alternatively, as shown in FIG. 12, in a period Y in which the two switching elements 32a, 32b are simultaneously turned off, the electronic control unit 20 may continuously output both of the first drive command (that is, the low-level drive signal CP) and the first drive stop command (that is, the high-level drive stop signal CST). Further alternatively, although not shown, the electronic control unit 20 may continuously output both of the second drive command (that is, the high-level drive signal CP) and the second drive stop command (that is, the low-level drive stop signal CST). Also, by such an aspect, the electronic control unit 20 can keep turning off the two switching elements 32a, 32b simultaneously.

As it has been described so far, with the configuration of this embodiment, the electronic control unit 20 can keep turning off the two switching elements 32a, 32b simultaneously without outputting the drive prohibition signal CSDN. Accordingly, the configuration to output the drive prohibition signal CSDN is unnecessary. Thus, it is possible to simplify the configurations of the electronic control unit 20 and the drive circuit unit 18 and the configuration of the cable 22 that mutually connects the electronic control unit 20 and the drive circuit unit 18. Alternatively, the signal line used for the drive prohibition signal CSDN in the signal cable 22 can be used for another application.

A description will be made on a power converter of a fourth embodiment with reference to FIG. 13 and FIG. 14. Compared to the power converter in the third embodiment, in the power converter in this embodiment, the control signals output by the electronic control unit 20 are changed. In detail, the electronic control unit 20 in this embodiment is configured to output the drive prohibition signal CSDN instead of the drive stop signal CST and thus differs from the electronic control unit 20 in the third embodiment in this point. The rest of the configuration is in common with that in the third embodiment. Thus, an overlapping description will not be made herein.

As shown in FIG. 14, the electronic control unit 20 in this embodiment realizes the single-arm switching control in a period X by using the drive prohibition signal CSDN. For example, in the case where only the first switching element 32a is intermittently turned on, the electronic control unit 20 outputs the drive prohibition signal CSDN when outputting the second drive command (that is, the high-level drive signal CP). Meanwhile, in the case where only the second switching element 32b is intermittently turned on, the electronic control unit 20 outputs the drive prohibition signal CSDN when outputting the first drive command (that is, the low-level drive signal CP). In this way, the electronic control unit 20 can execute the single-arm switching control to intermittently turn on the first switching element 32a or the second switching element 32b only when necessary.

The detailed description has been made so far on several specific examples. However, these specific examples are merely illustrative and do not limit the claims. The technique described in the claims includes various modifications and changes that are made to the specific examples described so far. The technical elements that are described in the present specification and the drawings demonstrate technical utility when used singly or in various combinations.

What is claimed is:

1. A power converter comprising:
a power conversion circuit including a first switching element and a second switching element that is connected in series to the first switching element; and
an electronic control unit configured to output plural control commands for the first switching element and the second switching element to the power conversion circuit,
the electronic control unit being configured to output a first drive command, a second drive command, a first drive stop command, and a second drive stop command,
the first drive command being a command to turn on the first switching element, and the second drive command being a command to turn on the second switching element, and
the first drive command and the second drive command being selectively output from the electronic control unit in a form of a single drive signal that changes discretely between two values, the first drive stop command being a command to turn off the first switching element regardless of presence or absence of the first drive command, and the second drive stop command being a command to turn off the second switching element regardless of presence or absence of the second drive command.

2. The power converter according to claim 1, wherein the first drive stop command and the second drive stop command are selectively output from the electronic control unit in the form of a single drive stop signal that changes discretely between at least two values.

3. The power converter according to claim 2, wherein the single drive stop signal is a signal that changes discretely among at least three values, and one of the at least three values represents a command to permit turn-on of the first switching element and the second switching element.

4. The power converter according to claim 1, wherein the electronic control unit is configured to alternately output the first drive command and the second drive command in the form of the single drive signal when turning off both of the first switching element and the second switching element,
the electronic control unit is configured to output the first drive stop command in a period of outputting the first drive command and output the second drive stop command in a period of outputting the second drive command.

5. The power converter according to claim 1, wherein the electronic control unit is configured to execute either one of first control and second control when turning off both of the first switching element and the second switching element,
the first control being control to continuously output both of the first drive command and the first drive stop command, and the second control being control to continuously output both of the second drive command and the second drive stop command.

6. The power converter according to claim 1, wherein the power conversion circuit includes a DC-DC converter, and the DC-DC converter includes the first switching element and the second switching element.

7. A power converter comprising:
a power conversion circuit including a first switching element and a second switching element that is connected in series to the first switching element; and an electronic control unit configured to output plural control commands for the first switching element and the second switching element to the power conversion circuit, the electronic control unit being configured to output a first drive command, a second drive command, and a drive prohibition command, the first drive command being a command to turn on the first switching element, and the second drive command being a command to turn on the second switching element, and the first drive command and the second drive command being selectively output from the electronic control unit in a form of a single drive signal that takes two values, the drive prohibition command being a command to prohibit turn-on of the first switching element and the second switching element regardless of the value of the single drive signal, and the electronic control unit being configured to alternately outputting the first drive command and the second drive command in a form of the single drive signal when the electronic control unit intermittently turns on only the first switching element in a state where the second switching element is turned off, the electronic control unit being configured to output the drive prohibition command in a period of outputting the second drive command.

8. The power converter according to claim 7, wherein the electronic control unit is configured to alternately outputting the first drive command and the second drive command in the form of the single drive signal when the electronic control unit intermittently turns on only the second switching element in a state where the first switching element is turned off, the electronic control unit is configured to output the drive prohibition command in a period of outputting the first drive command.

9. A control method of a power converter, the power converter including: a power conversion circuit that includes a first switching element and a second switching element connected in series to the first switching element; and an electronic control unit configured to output plural control commands for the first switching element and the second switching element to the power conversion circuit, the control method comprising:

outputting, by the electronic control unit, a first drive command, a second drive command, a first drive stop command, and a second drive stop command the first drive command is a command to turn on the first switching element, and the second drive command is a command to turn on the second switching element, and the first drive command and the second drive command are selectively output from the electronic control unit in a form of a single drive signal that changes discretely between two values, the first drive stop command is a command to turn off the first switching element regardless of presence or absence of the first drive command, and the second drive stop command is a command to turn off the second switching element regardless of presence or absence of the second drive command.

* * * * *